United States Patent
Vermeersch (10) Patent No.: US 8,087,312 B2
(45) Date of Patent: Jan. 3, 2012

(54) AUTOMOTIVE TRANSMISSION SHIFT SYSTEM LINEAR MEASUREMENT DEVICE

(75) Inventor: Michael C. Vermeersch, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 837 days.

(21) Appl. No.: 12/175,722

(22) Filed: Jul. 18, 2008

(65) Prior Publication Data

US 2010/0011604 A1    Jan. 21, 2010

(51) Int. Cl.
*G01N 19/00* (2006.01)
(52) U.S. Cl. .......................... 73/865.9; 33/784
(58) Field of Classification Search .................. None
See application file for complete search history.

(56) References Cited

U.S. PATENT DOCUMENTS

| | | | | |
|---|---|---|---|---|
| 4,121,555 | A * | 10/1978 | Zbikowski et al. | 123/374 |
| 4,419,824 | A * | 12/1983 | Oberhans | 33/784 |
| 4,520,686 | A * | 6/1985 | Renk | 74/473.1 |
| 4,612,656 | A * | 9/1986 | Suzuki et al. | 377/24 |
| 7,472,627 | B2 * | 1/2009 | Skelton et al. | 74/586 |

* cited by examiner

*Primary Examiner* — Hezron E. Williams
*Assistant Examiner* — Mark A Shabman
(74) *Attorney, Agent, or Firm* — Cantor Colburn LLP

(57) ABSTRACT

A measurement device includes a base extending along a longitudinal axis, an input connector configured for attachment to a shifter assembly of a vehicle and a clamp configured for attachment to a linkage support bracket of the vehicle. The measurement device measures the linear displacement of a linkage interconnecting the shifter assembly and a transmission of the vehicle in response to movement of the shifter assembly between a first position and a second position. A scale is attached to the input connector and slideably supported by the clamp. A scale reader is attached to the base for measuring linear movement of the scale in response to movement of the shifter assembly between the first and second positions. Preferably, the scale and the scale reader comprise a digital measuring unit having a digital display for displaying the measured linear movement.

25 Claims, 7 Drawing Sheets

AUTOMOTIVE TRANSMISSION SHIFT SYSTEM LINEAR MEASUREMENT DEVICE

BACKGROUND OF THE INVENTION

1. Field of the Invention

The subject invention generally relates to a measurement device for measuring a linear displacement of a linkage interconnecting a shifter assembly and a transmission of a vehicle. The linkage being linearly displaced in response to movement of the shifter assembly between a first position and a second position.

2. Description of the Prior Art

The linear displacement of the linkage interconnecting the shifter assembly and the transmission must be known so that the linkage may be properly designed for each vehicle, to ensure that the interaction between the shifter assembly and the transmission functions properly. The shifter assembly may be located on a steering column, or alternatively may be disposed within a center counsel of the vehicle. The linkage typically includes a combination of rods and/or push pull cables to transmit linear movement between the shifter mechanism and the transmission. The precise linear distance the shifter assembly travels when moving between a first position and a second position, i.e., between park and drive or between park and reverse, must be known and be coordinated with the transmission so that the movement of the shifter assembly corresponds to the accompanying movement of the transmission.

Previously, individual measurement devices have been constructed for each specific vehicle design. Accordingly, the prior art measurement devices were specific to each different vehicle. These prior art measurement devices typically coupled the shifter assembly to a series of rods, which were linked to one or more gages that would measure the movement of the connecting rods. If for example the shifter assembly was mounted to the steering column, the entire steering column/shifter assembly would need to be mounted to the prior art measurement devices. While these systems provided an estimate of the linear displacement of the linkage, the results were not exact because the prior art measurement devices did not actually simulate the actual movement of the linkage. This is because the prior art measurement device only moves linearly, whereas the actual linkage pivots along arcuate path in addition to moving linearly. Furthermore, these prior art measurement devices were large, heavy and cumbersome.

Accordingly, there remains a need for a more versatile measurement device that accurately simulates the movement of the linkage to measure the actual linear displacement of the linkage.

SUMMARY OF THE INVENTION AND ADVANTAGES

The subject invention provides a measurement device. The measurement device measures a linear displacement of a linkage. The linkage interconnects a shifter assembly and a transmission of a vehicle. The linkage is linearly displaced in response to movement of the shifter assembly between a first position and a second position. A linkage support bracket connects the linkage to the vehicle. The measurement device comprises a base. The base defines an elongated slot extending along a longitudinal axis. An input connector is configured for attachment to the shifter assembly, and includes a guided portion engaging the elongated slot. The guided portion engages the elongated slot for guided linear movement within the elongated slot relative to the base. The guided movement is in response to the movement of the shifter assembly between the first position and the second position. A clamp is pivotably coupled to the base. The clamp is configured for attachment to the linkage support bracket of the vehicle to fixedly securing the base to the linkage support bracket. A sensing unit is coupled to the base. The sensing unit senses the guided linear movement of the input connector relative to the base.

Accordingly, the measurement device of the subject invention attaches directly to the shifter assembly and the linkage support bracket of the vehicle in place, thereby simulating the actual movement of the linkage to provide a more accurate measurement and to provide a more versatile measurement device than known in the prior art. Because the measurement device of the subject invention attaches to the shifter assembly and the linkage support bracket directly, the measurement device may be utilized in place during prototype design, production, validation, and vehicle verification operations, thereby eliminating separate out of vehicle testing.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
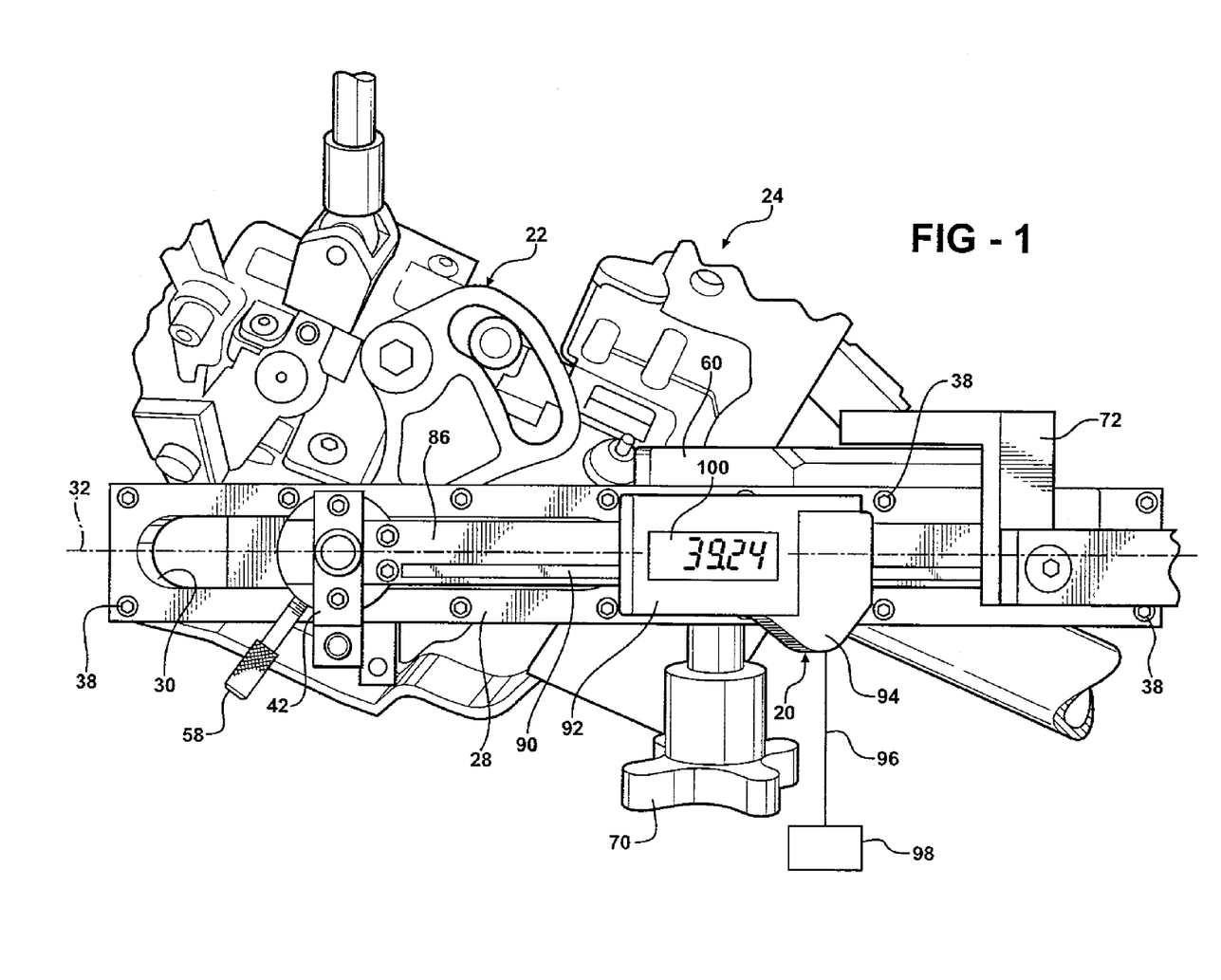
FIG. 1 is a perspective view of a measurement device attached to a shifter assembly shown mounted on a steering column assembly.
Figure 2:
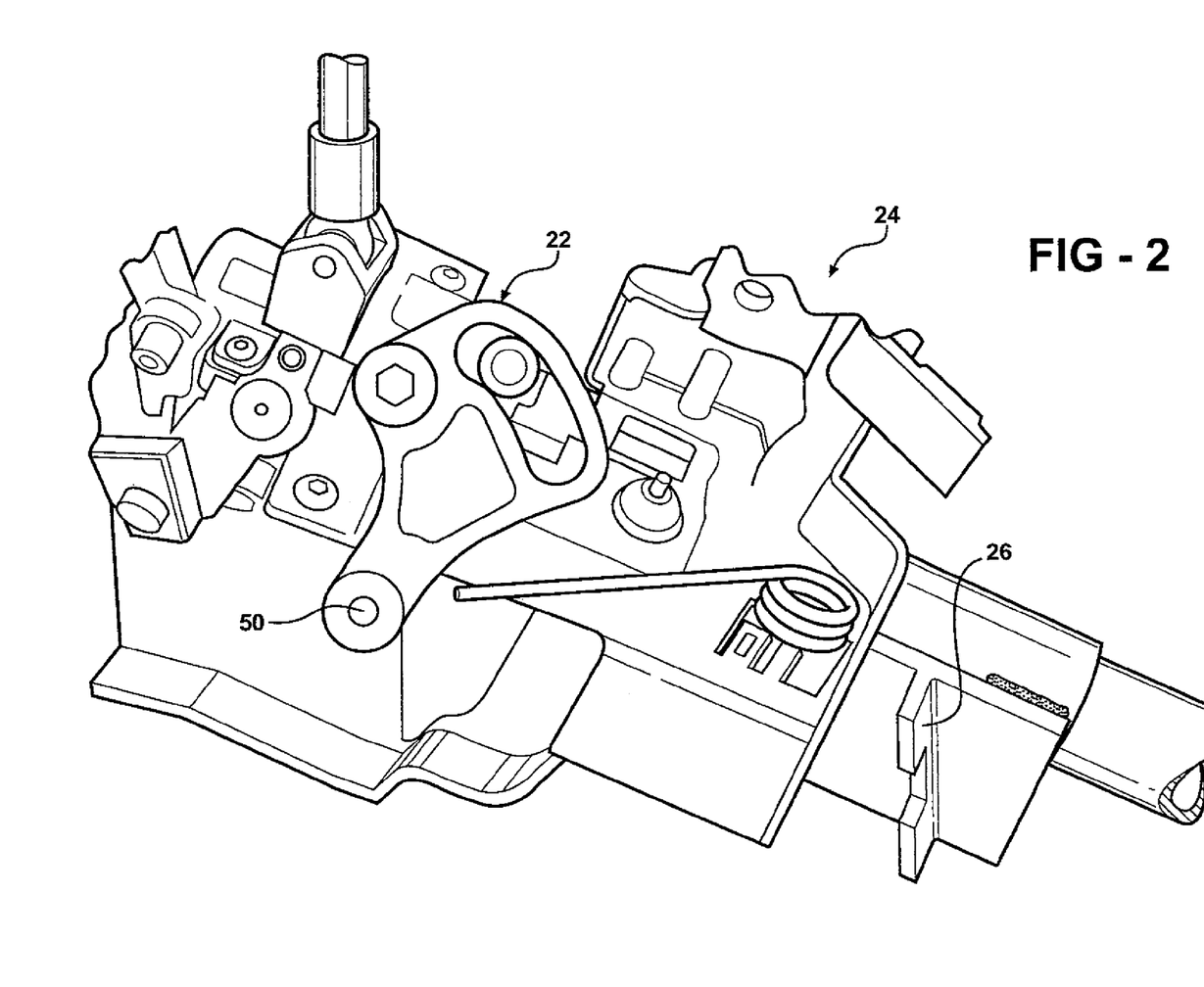
FIG. 2 is a perspective view of the shifter assembly and the steering column assembly without the measurement device.

Referring to the Figures, wherein like numerals indicate corresponding parts throughout the several views, a measurement device is generally shown at 20. Referring to FIGS. 1 and 2, the measurement device 20 measures a linear displacement of a linkage (not shown) interconnecting a shifter assembly 22 and a transmission (not shown) of a vehicle (not shown). The linkage is linearly displaced in response to movement of the shifter assembly 22 between a first position and a second position. It should be appreciated that the shifter assembly 22 includes several different positions corresponding to different positions of the transmission. The different positions of the shifter assembly 22 typically include a park position, a drive position, a neutral position and a reverse position. Accordingly, it should be appreciated that the first position and the second position may include any of the different positions of the shifter assembly 22. It should also be appreciated that the different positions of the shifter assembly 22 may further include other positions specific to the transmission.

The shifter assembly 22 may be mounted to a steering column assembly 24 as is well known and shown in FIG. 1. Alternatively, the shifter assembly 22 may be mounted to a center counsel of the vehicle, i.e., the shifter assembly 22 may comprise a floor shifter as is also well known. The linkage typically includes a combination of rods and/or push-pull cables to transmit the movement of the shifter assembly 22 to the transmission.

Figure 9:
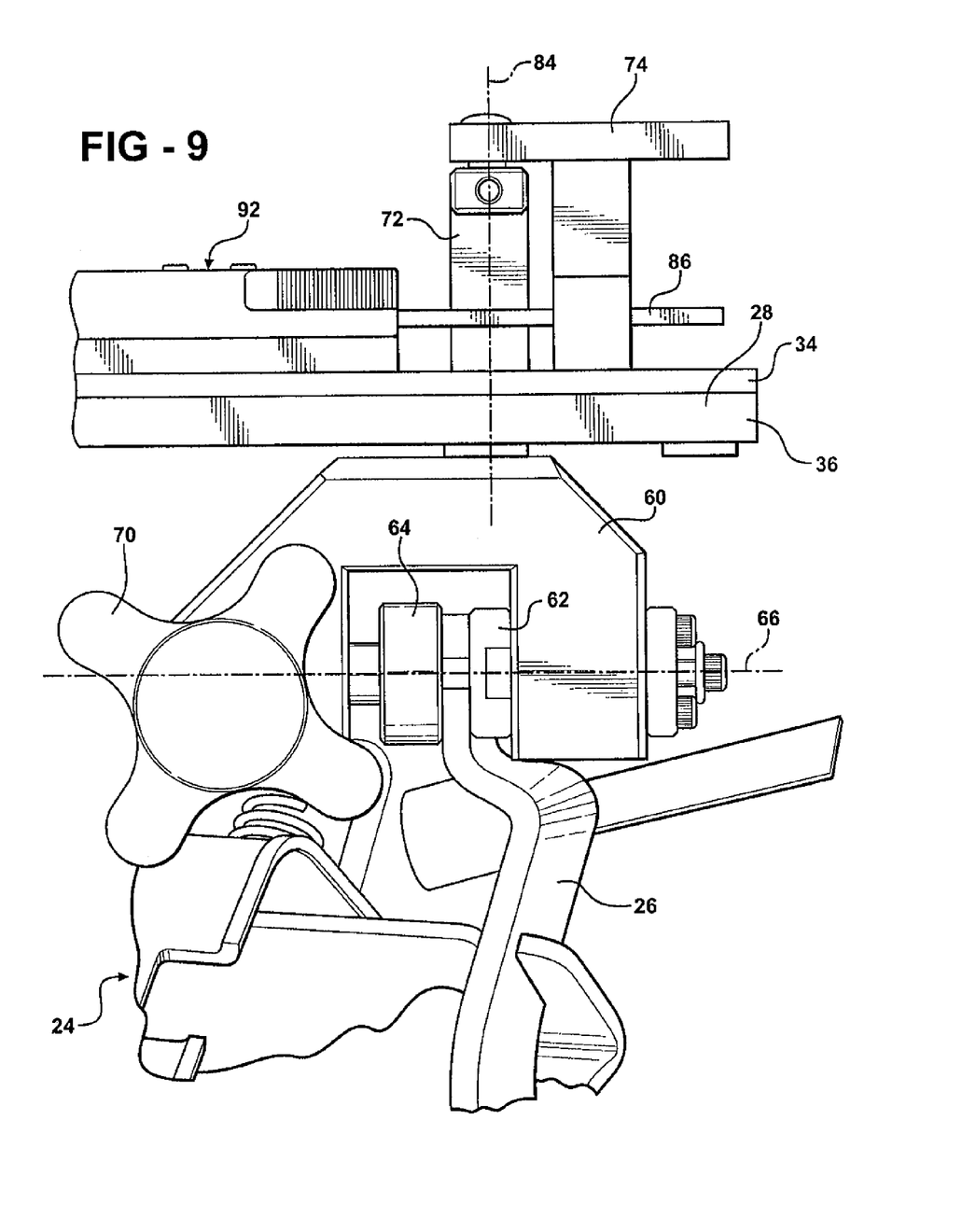
FIG. 9 is an enlarged partial plan view of the measurement device attached to the steering column assembly.

A linkage support bracket 26, best shown in FIG. 9, connects the linkage to the vehicle. The linkage support bracket 26 may be configured in any suitable manner to accommodate the different design constraints of the different vehicles. Accordingly, the linkage support bracket 26 may be differently configured in each different vehicle. However, it should be appreciated that the linkage support bracket 26 supports the linkage and provides a solid point of attachment between the linkage and the vehicle. If the shifter assembly 22 is mounted to the steering column assembly 24, the linkage support bracket 26 may also be part of and attached to the steering column assembly 24 as shown. However, it should be appreciated that the linkage support bracket 26 may alternatively be attached to some other part of the vehicle, other than the steering column assembly 24.

Referring to FIGS. 1 and 3 through 6, the measurement device 20 includes a base 28. The base 28 defines an elongated slot 30 extending along a longitudinal axis 32. The base 28 includes a top portion 34 and a bottom portion 36 cooperating together to define the slot. The top portion 34 and the bottom portion 36 are rigidly connected by a plurality of fasteners 38 extending through the top portion 34 and into threaded engagement with the bottom portion 36. The top portion 34 and the bottom portion 36 cooperate together to define an interior cavity 40 therebetween. The internal cavity extends along the longitudinal axis 32 and is open to the elongated slot 30. The purpose of the internal cavity is described in greater detail below.

An input connector 42 is coupled to the base 28. The input connector 42 inputs the movement from the shifter assembly 22 to the measurement device 20. The input connector 42 includes a guided portion 44 and an arm portion 46. The guided portion 44 is in sliding engagement with the elongated slot 30 for guided linear movement within the elongated slot 30. The guided portion 44 of the input connector 42 moves relative to the base 28 in response to the movement of the shifter assembly 22 between the first position and the second position. Accordingly, as the shifter assembly 22 is moved between the park position and the drive position, for example, the input connector 42 and thereby the guided portion 44 of the input connector 42 moves linearly relative to the base 28.

Figure 6:
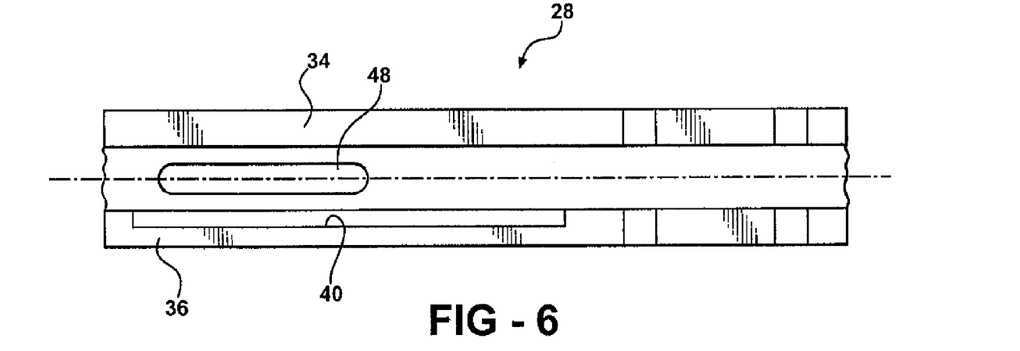
FIG. 6 is a partial cross sectional view along a longitudinal axis of the measurement device.

As best shown in FIG. 6, the guided portion 44 of the input connector 42 includes a plate 48. The plate 48 is disposed between the top portion 34 and the bottom portion 36 of the base 28 and moveable relative to the top portion 34 and the bottom portion 36 within the elongated slot 30 and the internal cavity. The internal cavity is sized to permit free movement of the plate 48 along the longitudinal axis 32, yet prevent unwanted and undesirable lash between the plate 48 and the top portion 34 and the bottom portion 36. The plate 48 assists in stabilizing the input connector 42 during linear movement to remove any lash between the base 28 and the input connector 42.

Referring back to FIG. 2, the input connector 42 is configured for attachment to the shifter assembly 22. The shifter assembly 22 includes a shifter attachment device 50 for connecting the shifter assembly 22 to the linkage. The shifter attachment device 50 may include a ball stud. However, it should be appreciated that the shifter attachment device 50 may include some other device 20 capable of pivotably attaching the linkage to the shifter assembly 22.

Figure 3:
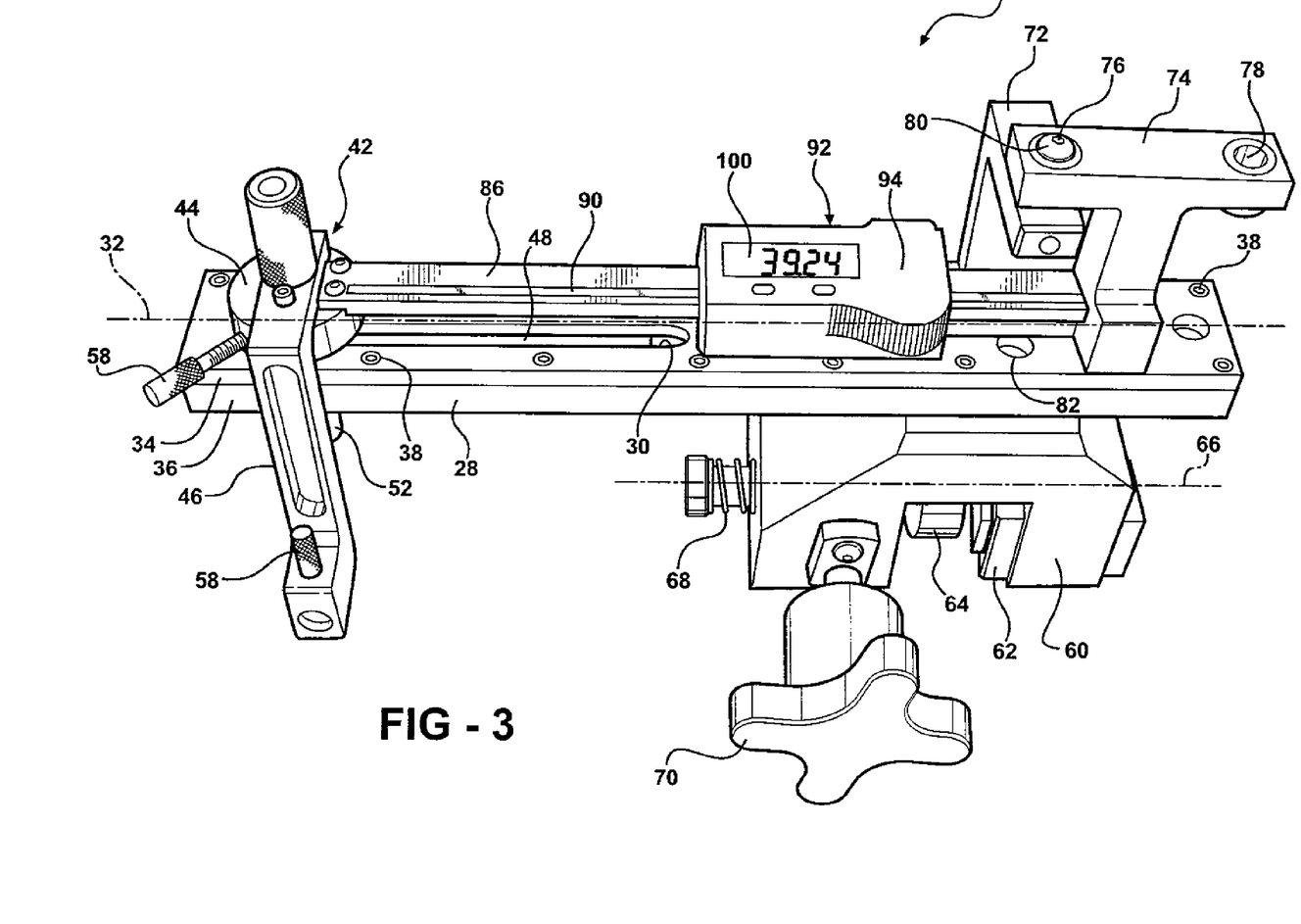
FIG. 3 is a perspective view of the measurement device.
Figure 4:
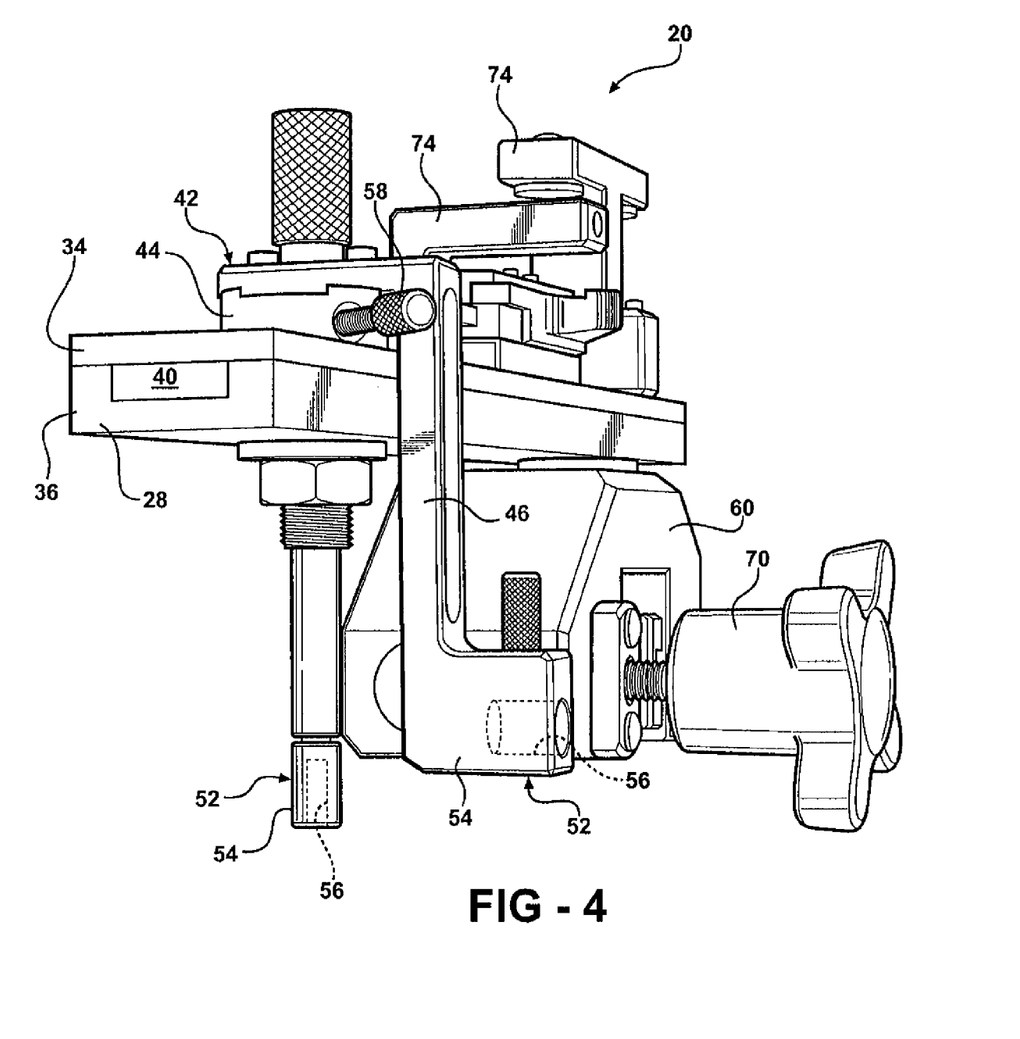
FIG. 4 is another perspective view of the measurement device.
Figure 5:
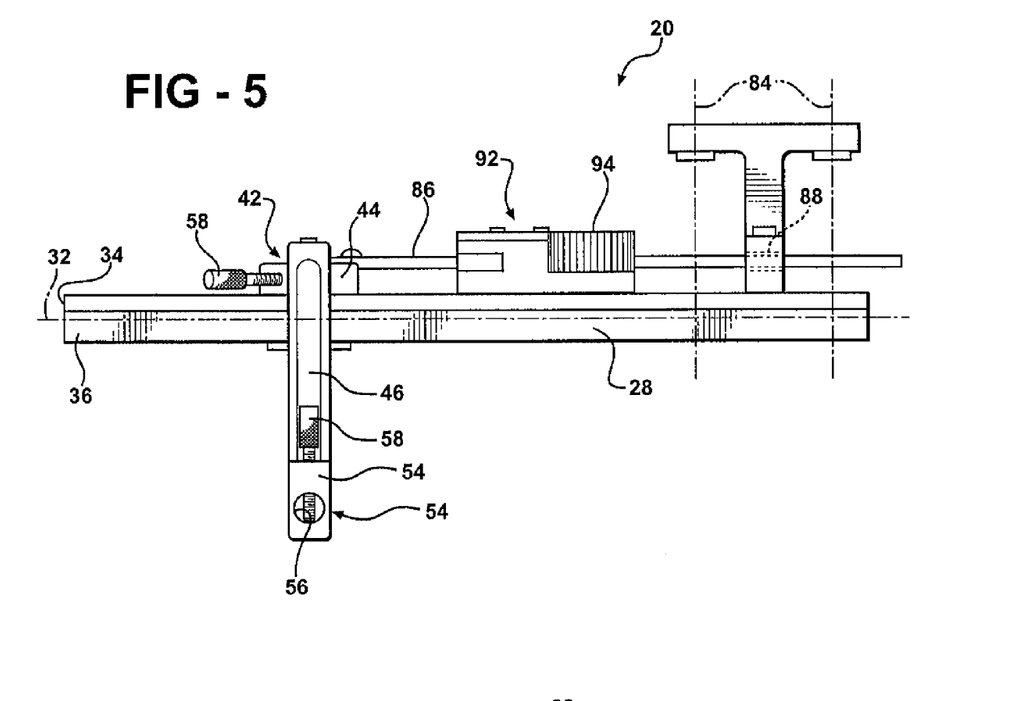
FIG. 5 is a plan view of the measurement device.

As best shown in FIGS. 3 through 5, the input connector 42 includes a connector mechanism 52. The connector mechanism 52 couples the input connector 42 to the shifter assembly 22. More specifically, the connector mechanism 52 couples the input connector 42 to the shifter attachment device 50. The attachment mechanism includes a seat 54. The seat 54 engages the shifter attachment device 50 on the shifter assembly 22.

The seat 54 may include a depression 56 for receiving the ball stud therein. As described above, the input connector 42 includes an arm portion 46. The arm portion 46 is attached to and extends from the guide portion. The arm portion 46 extends from the guide portion to the shifter attachment device 50. As shown, the arm portion 46 defines the seat 54. However, it should be appreciated that the seat 54 may be disposed on the guide portion, and that the arm portion 46 merely permits for attachment to the shifter assembly 22 in spaced relationship relative to the guided portion 44. As shown, the input connector 42 includes a first arm portion 46A and a second arm portion 46B. The second arm portion 46B positions the seat 54 at a ninety degree (90°) angle relative to the first arm portion 46A, to thereby permit attachment to other types of shifter attachment devices 50. It should be appreciated that the shape and configuration of the shifter attachment device 50 and the seat 54 may encompass many different configurations, and that the scope of the invention should not be limited to the configuration and interaction between the shifter attachment device 50 and the seat 54 shown and described herein.

The connector mechanism 52 further includes a seat set screw 58 in threaded engagement with the input connector 42. The seat set screw 58 secures the shifter attachment device 50 to the seat 54. Accordingly, once the shifter attachment device 50 is firmly positioned in the seat 54, the seat set screw 58 is advanced into engagement with the shifter attachment device 50. The interaction of the seat set screw 58 and the shifter attachment device 50 prevents the shifter attachment device 50 from being withdrawn from the seat 54, yet permits pivotable movement between the input connector 42 and the shifter attachment device 50.

Referring to FIGS. 3, through 5 and 7 through 9, a clamp 60 is fixedly coupled to the base 28. The clamp 60 is configured for attachment to the linkage support bracket 26 of the vehicle, i.e., the linkage support bracket 26 and the base 28 are pivotable relative to the clamp 60. Accordingly, the clamp 60 fixedly secures the base 28 to the linkage support bracket 26.

The clamp 60 includes a generally C-shaped jaw having an insert 62 disposed on one portion of the jaw and a head 64 disposed opposite the insert 62 on the other portion of the jaw. As best shown in FIG. 9, the insert 62 is configured to mate with the linkage support bracket 26 in interlocking mechanical engagement. Preferably, the insert 62 includes a plurality of differently configured interchangeable inserts 62, with each of the plurality of differently configured interchangeable inserts 62 configured to mate with a differently configured linkage support bracket 26. As such, by changing the insert 62 within the clamp 60, the measurement device 20 may be used with the different vehicles having differently configured linkage support brackets 26.

Figure 7:
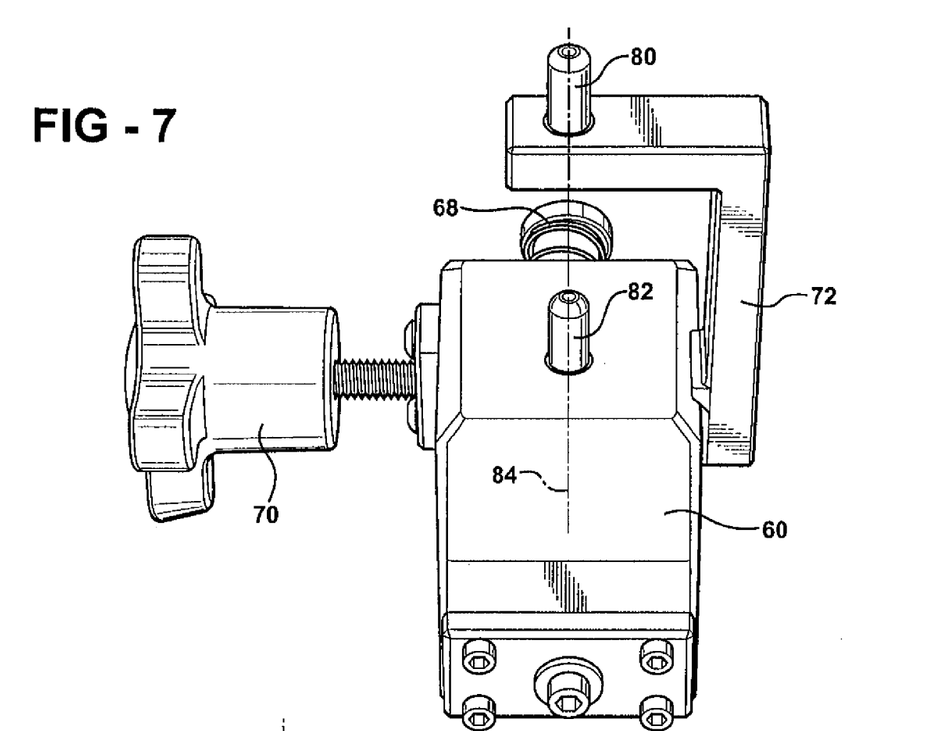
FIG. 7 is a perspective view of a clamp of the measurement device.
Figure 8:
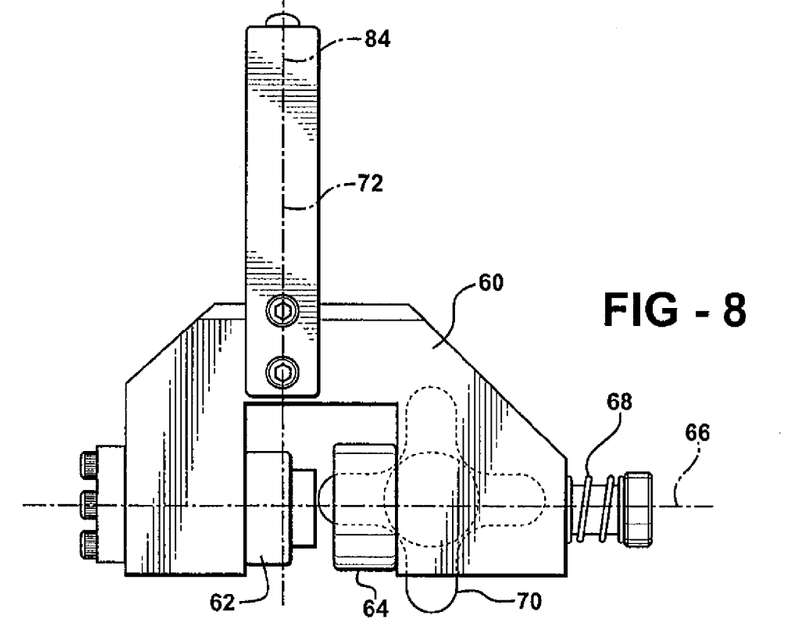
FIG. 8 is plan view of the clamp of the measurement device.

The head 64 of the clamp 60 is moveable along a clamp axis 66. The head 64 engages the linkage support bracket 26 opposite the insert 62. As such, the linkage support bracket 26 is sandwiched between the insert 62 and the head 64. The clamp 60 includes a biasing member 68 coupled to the head 64 for biasing the head 64 along the clamp axis 66 into engagement with the linkage support bracket 26. Accordingly, the linkage support bracket 26 is retained between the insert 62 and the head 64. The clamp 60 further includes a head set screw 70 for positionally securing the head 64. Once the linkage support bracket 26 is positioned between the insert 62 and the head 64, the biasing member 68 urges the head 64 into tight compressing engagement. The head set screw 70 is then advanced into engagement with the head 64 to secure the head 64 relative to the jaw of the clamp 60 to prevent the head 64 from moving.

A clamp connector 72 interconnects the clamp 60 and the base 28. As shown, the clamp connector 72 includes a generally T-shaped configuration, in which an axial beam 74 extends along the longitudinal axis 32. The clamp connector 72 includes a first attachment point 76 and a second attachment point 78 disposed along the axial beam 74. The first attachment point 76 attaches the clamp 60 to the base 28 in a first position. The second attachment point 78 attaches the clamp 60 to the base 28 in a second position. The second position is axially spaced from the first position along the longitudinal axis 32. It should be appreciated that the clamp connector 72 may be configured differently than shown or described herein to accommodate different vehicles. It should also be appreciated that the clamp 60 may alternatively be directly connected to the base 28, thereby not utilizing the clamp connector 72 to interconnect the clamp 60 to the base 28.

The clamp 60 includes a first pin 80 in pivotable engagement with the base 28, and a second pin 82 in pivotable engagement with the clamp connector 72. The second pin 82 is pivotably attached to one of the first attachment point 76 and the second attachment point 78. The first pin 80 and the second pin 82 are axially aligned along a pivot axis 84 and spaced from each other along the pivot axis 84 to permit relative pivotable movement between the clamp 60 and the base 28. In other words, the base 28 and the clamp connector 72 are free to pivot about the pivot axis 84 relative to the clamp 60. The pivotal movement of the base 28 relative to the clamp 60 permits the measurement device 20 to accurately track or simulate the movement of the linkage. Accordingly, in response to movement of the shifter assembly 22 between the first position and the second position, the base 28 and thereby the input connector 42 pivot about the pivot axis 84, while the input connector 42 also moves linearly along the longitudinal axis 32.

The clamp connector 72 slideably supports a scale 86, described in greater detail below. As shown, the clamp connector 72 defines a passage 88 with the scale 86 slideably disposed within the passage 88. It should be appreciated that the scale 86 may be supported relative to the base 28 in some other manner not shown or described herein.

As best shown in FIGS. 3 through 5, the scale 86 is attached to and linearly moveable with the input connector 42. More specifically, the scale 86 is attached to the guided portion 44 of the input connector 42. Preferably, the scale 86 includes a linear encoder 90 for storing linear measurement data. The linear measurement data represents measurable incremental distances along the scale 86. However, it should be appreciated that the scale 86 may alternatively include indicia printed thereon representing the measurable incremental distances along the scale 86.

The measurement device 20 further includes a sensing unit 92 for sensing the guided linear movement of the input connector 42 relative to the base 28. Preferably, the sensing unit 92 includes an electronic scale reader 94. The electronic scale reader 94 is attached to the base 28 and coupled to the scale 86. The scale reader 94 measures the linear movement of the scale 86 relative to the scale reader 94. The scale reader 94 is capable of reading the linear measurement data stored within the linear encoder 90 of the scale 86. However, it should be appreciated that the sensing unit 92 may include some manner of visual indicator permitting visual reading of the measured distance of the scale 86 relative to the scale reader 94. For example, it should be appreciated that the sensing unit 92 may include a pointer, which is utilized to index or read measurement or distance indicia printed directly on the base 28.

If the sensing unit 92 includes an electronic scale reader 94, then the scale reader 94 may include an output 96. The output 96 sends a signal, including data representing the measured linear movement, to a computer 98. The computer 98 may store the data and utilize the data within a software program for analysis.

Preferably, a display 100 is coupled to the sensing unit 92. The display 100 displays 100 the sensed, i.e., measured, linear movement of the input connector 42. Specifically, the display 100 displays 100 the measured linear movement between the scale 86 and the scale reader 94, which represents the displacement of the linkage under actual conditions. Preferably, the display 100 includes a digital display 100. However, it should be appreciated that the display 100 may alternatively include a simple dial display 100 or the like. The display 100 may be integral with the sensing unit 92. Alternatively, the display 100 may be coupled through cables to the sensing unit 92 and disposed remotely relative to the sensing unit 92.

Preferably, the scale 86, the scale reader 94 and the display 100 are combined into an electronic scale 86 unit. The scale 86 unit is preferably digital. One such suitable digital scale 86 unit suited for use in the subject invention is an ABSOLUTE Digimatic Scale 86 Unit™, manufactured by Mitutoyo Corp.

In operation, referring back to FIG. 1, the measurement device 20 is mounted to the shifter assembly 22 and the linkage support bracket 26. As described above, the input connector 42 is attached to the shifter attachment device 50 and the clamp 60 is attached to the linkage support bracket 26. Accordingly, the measurement devise sits in the place of the linkage, effectively simulating the linkage. In response to movement of the shifter bracket between the first position and the second position, the input connector 42 moves with the shifter assembly 22 relative to the base 28 and the clamp 60. As the scale 86 is attached to the input connector 42, the scale 86 moves with the input connector 42 along the longitudinal axis 32. It should be appreciated that the plate 48 attached to the guided portion 44 of the input connector 42 moves within the internal cavity of the base 28, and helps stabilize the movement of the input connector 42 and thereby the scale 86 from any undesirable lash, which is not associated with the actual movement of the linkage that the measurement devices 20 is simulating. As the scale 86 moves in response to the movement of the shifter assembly 22, the scale reader 94 detects or measures the encoded data within the scale 86 to measure the movement of the scale 86 relative to the scale reader 94. The movement of the scale 86 relative to the scale reader 94 is equal to the linear displacement that the linkage would encounter during operating conditions. The display 100 visually outputs 96 the measured linear displacement. The scale reader 94 may alternatively output 96 the measured linear displacement to a computer 98 for analysis.

The invention has been described in an illustrative manner, and it is to be understood that the terminology which has been used is intended to be in the nature of words of description rather than of limitation. As is now apparent to those skilled in

What is claimed is:

1. A measurement device for measuring a linear displacement of a linkage interconnecting a shifter assembly and a transmission of a vehicle in response to movement of the shifter assembly between a first position and a second position, wherein a linkage support bracket connects the linkage to the vehicle, said measurement device comprising:
a base defining an elongated slot extending along a longitudinal axis;
an input connector configured for attachment to the shifter assembly and including a guided portion engaging said elongated slot for guided linear movement within said elongated slot relative to said base in response to the movement of the shifter assembly between the first position and the second position;
a clamp pivotably coupled to said base and configured for attachment to the linkage support bracket of the vehicle for securing said base to the linkage support bracket; and
a sensing unit coupled to said base for sensing said guided linear movement of said input connector relative to said base.

2. A device as set forth in claim 1 further comprising a scale attached to and linearly moveable with said input connector with said sensing unit coupled to said scale for sensing said linear movement of said scale relative to said sensing unit.

3. A device as set forth in claim 2 further comprising a clamp connector interconnecting said clamp and said base.

4. A device as set forth in claim 3 wherein said clamp connector includes a first attachment point for attachment to said clamp in a first position and a second attachment point for attachment to said clamp in a second position spaced from said first position along said longitudinal axis.

5. A device as set forth in claim 4 wherein said clamp includes a first pin in engagement with said base and a second pin axially aligned with and spaced from said first pin along a pivot axis and engaging one of said first attachment point and said second attachment point with said clamp pivotable relative to said base and said clamp connector about said pivot axis.

6. A device as set forth in claim 4 wherein said clamp connector slideably supports said scale.

7. A device as set forth in claim 6 wherein said clamp connector defines a passage with said scale slideably disposed within said passage.

8. A device as set forth in claim 2 wherein said scale is attached to said guided portion of said input connector.

9. A device as set forth in claim 8 wherein said scale includes a linear encoder for storing linear measurement data.

10. A device as set forth in claim 9 wherein said sensing unit includes an electronic scale reader capable of reading said linear measurement data stored within said linear encoder.

11. A device as set forth in claim 10 wherein said electronic scale reader includes an output for sending a signal including data representing the sensed linear movement of said input connector to a computer.

12. A device as set forth in claim 1 further comprising a display coupled to said sensing unit for displaying said sensed linear movement of said input connector.

13. A device as set forth in claim 12 wherein said display includes a digital display.

14. A device as set forth in claim 1 wherein said base includes a top portion and a bottom portion cooperating together to define said slot.

15. A device as set forth in claim 14 wherein said guided portion of said input connector includes a plate disposed between said top portion and said bottom portion and moveable relative to said top portion and said bottom portion.

16. A device as set forth in claim 1 wherein said input connector includes an arm attached to and extending from said guided portion.

17. A device as set forth in claim 16 wherein said input connector includes a connector mechanism for coupling said input connector to the shifter assembly.

18. A device as set forth in claim 17 wherein said attachment mechanism includes a seat for engaging a shifter attachment device on the shifter assembly.

19. A device as set forth in claim 18 wherein said attachment mechanism includes a seat set screw in threaded engagement with said input connector for securing the shifter attachment device to said seat.

20. A device as set forth in claim 19 wherein said seat includes a depression defined by said arm.

21. A device as set forth in claim 1 wherein said clamp includes an insert configured to mate with the linkage support bracket in interlocking mechanical engagement.

22. A device as set forth in claim 21 wherein said insert includes a plurality of differently configured interchangeable inserts with each of said plurality of differently configured interchangeable inserts configured to mate with a differently configured linkage support bracket.

23. A device as set forth in claim 21 wherein said clamp includes a head moveable along a clamp axis for engaging the linkage support bracket opposite said insert.

24. A device as set forth in claim 23 wherein said clamp includes a biasing member coupled to said head for biasing said head along said clamp axis into engagement with the linkage support bracket such that the linkage support bracket is retained between the insert and the head.

25. A device as set forth in claim 24 wherein said clamp includes a head set screw for positionally securing said head.

* * * * *